(12) United States Patent
Wang

(10) Patent No.: US 9,221,181 B2
(45) Date of Patent: Dec. 29, 2015

(54) SUPPORT ARM WITH BRAKE MECHANISM

(71) Applicant: Hiwin Technologies Corp., Taichung (TW)

(72) Inventor: Ren-Jeng Wang, Taichung (TW)

(73) Assignee: HIWIN TECHNOLOGIES CORP., Taichung (TW)

(*) Notice: Subject to any disclaimer, the term of this patent is extended or adjusted under 35 U.S.C. 154(b) by 136 days.

(21) Appl. No.: 14/257,657

(22) Filed: Apr. 21, 2014

(65) Prior Publication Data

US 2015/0174769 A1    Jun. 25, 2015

(30) Foreign Application Priority Data

Dec. 23, 2013  (TW) .............................. 102147803 A

(51) Int. Cl.
*B25J 19/00* (2006.01)
*F16D 63/00* (2006.01)
*B25J 9/10* (2006.01)
*B60T 13/74* (2006.01)
*F16D 121/20* (2012.01)

(52) U.S. Cl.
CPC ............ *B25J 19/0004* (2013.01); *B25J 9/1065* (2013.01); *B25J 19/0016* (2013.01); *B60T 13/748* (2013.01); *F16D 63/008* (2013.01); *F16D 2121/20* (2013.01)

(58) Field of Classification Search
CPC .. B25J 9/1065; B25J 19/0004; B25J 19/0016; B25J 13/02; B25J 13/04; B27B 17/083; G05G 9/047; H02K 49/043; F16D 63/008; F16D 2121/20; F16D 55/00; F16D 51/00; F16D 2127/12; F16D 59/02; F16D 49/00; F16D 49/10; F16D 2055/0058
USPC .................................................. 188/164, 166
See application file for complete search history.

(56) References Cited

U.S. PATENT DOCUMENTS

| | | | | |
|---|---|---|---|---|
| 1,123,404 A * | 1/1915 | Sears | ..................... | B60G 17/06 188/130 |
| 4,160,536 A * | 7/1979 | Krogsrud | ............... | F16M 11/04 248/123.11 |
| 4,165,530 A * | 8/1979 | Sowden | .................. | F16M 11/04 248/280.11 |
| 4,682,749 A * | 7/1987 | Strater | ................... | A47B 27/18 188/166 |
| 4,770,384 A * | 9/1988 | Kuwazima | ............. | F16M 11/04 248/280.11 |
| 7,478,786 B2 * | 1/2009 | Copeland | ............... | F16M 11/04 248/280.11 |
| 2007/0001076 A1 | 1/2007 | Asamarai et al. | | |
| 2011/0260017 A1 | 10/2011 | Monsalve et al. | | |

* cited by examiner

*Primary Examiner* — Anna Momper
*Assistant Examiner* — San Aung
(74) *Attorney, Agent, or Firm* — Muncy, Geissler, Olds & Lowe, P.C.

(57) ABSTRACT

A Support arm with brake mechanism, characterized in that: a resilient component generates a resilient force acting in opposition to gravity, such that a supporting rod can move an object steadily; and, in the course of moving the object, a brake is started as needed to brake the supporting rod and fasten the supporting rod to a predetermined position.

7 Claims, 7 Drawing Sheets

SUPPORT ARM WITH BRAKE MECHANISM

BACKGROUND OF THE INVENTION

1. Technical Field

The present invention relates to robotic arms, and more particularly, to a Support arm with brake mechanism.

2. Description of Related Art

Mechanical arms are in wide use in the industrial sector, because they perform plenty tasks which are not manually doable, including highly difficult and dangerous tasks, such as moving, welding, cutting, and assembling, as well as any tasks not supposed to be performed manually.

There is related prior art. For instance, US 2007/0001076 discloses: a flexible element is disposed between a support arm and a resilient element; the flexible element pulls or pushes a first pulley to increase or decrease a restoring force of the resilient element in the course of the operation of the support arm, such that the resilient supporting force of the resilient element varies in response to the operation of the support arm. Furthermore, US 2011/0260017 discloses: a resilient component is disposed between upper and lower links; and an end of the resilient component is attached to a drag link to enable automatic adjustment of a resilient support force provided by the resilient component as a support arm is moved between upper and lower vertical positions.

The aforesaid two published patent applications have a disadvantage in common, that is, although the support arm is capable of moving up and down in order to move an object, the support arm lacks a positioning function, and in consequence the support arm cannot fasten the object steadily after moving the object to a predetermined position, thereby compromising any subsequent operation.

SUMMARY OF THE INVENTION

It is an objective of the present invention to provide a Support arm with brake mechanism positioned at a predetermined position as needed so as to enhance ease of operation.

In order to achieve the above and other objectives, the present invention provides a Support arm with brake mechanism comprising a fixing frame, a resilient device, a brake, a supporting rod, and a flexible component. The resilient device has a mounting base, a resilient component, and an end cover. The mounting base is disposed at the fixing frame and has a first side surface, a second side surface opposing the first side surface, and a mounting slot penetrating the first and second side surfaces. The resilient component is disposed in the mounting slot of the mounting base and has an end abutting against the first side surface of the mounting base. The end cover is movably disposed in the mounting slot of the mounting base and abuts against another end of the resilient component. The brake has a main spindle, a casing, and a braking unit. The main spindle is fixed to the fixing frame. The casing rotatably snugly encloses the main spindle. The braking unit is disposed in the casing to effectuate braking. The supporting rod is pivotally connected to the fixing frame and the peripheral surface of the casing of the brake to give support to an object to be moved. The flexible component winds around the peripheral surface of the casing of the brake. The flexible component has an end fixed to the peripheral surface of the casing of the brake and another end passing through the mounting slot of the mounting base of the resilient device and fixed to the end cover of the resilient device.

Given the aforesaid design, in the course of moving the object with the supporting rod, the flexible component pulls the end cover, such that the end cover compresses the resilient component and thus provides a supporting force until the object is moved to an appropriate height. As soon as the object reaches the appropriate height, the brake is started, such that the brake brakes the supporting rod and thus fixes the object in place.

Preferably, the braking unit has an armature, a spring leaf, and an armature plate. The armature is snugly engaged with the main spindle and fixed to the casing. The spring leaf is fixed to the main spindle. The armature plate is snugly engaged with the main spindle and fixed to a surface of the spring leaf, wherein the surface of the spring leaf faces the armature. Hence, if the armature is in a state of electrical disconnection, the armature plate will be attracted to the armature, thereby switching the brake to a braking position. If the armature is in a state of electrical connection, the armature will let the armature plate go, thereby switching the brake to a releasing position.

Preferably, the supporting rod has a first rod element, a second rod element parallel to the first rod element, and a third rod element disposed between the first and second rod elements. The first rod element has an end pivotally connected to the fixing frame through a first axle and another end pivotally connected to an end of the third rod element through a second axle. The second rod element has an end connected to the peripheral surface of the casing of the brake and another end pivotally connected to another end of the third rod element through a third axle. The third rod element has a switch unit. The switch unit has a control switch for controlling the electrical disconnection and electrical connection of the armature.

Preferably, the mounting base has a screw hole, and the resilient device further has a preload adjusting block and a preload adjusting screw. The preload adjusting block is fixed to the fixing frame and has a countersunk hole. The preload adjusting screw, capable of idle rotation, is disposed in the countersunk hole to mesh with the screw hole of the mounting base and thereby adjust the magnitude of the preload of the resilient component.

DETAILED DESCRIPTION OF THE EMBODIMENT OF THE INVENTION

Figure 1:
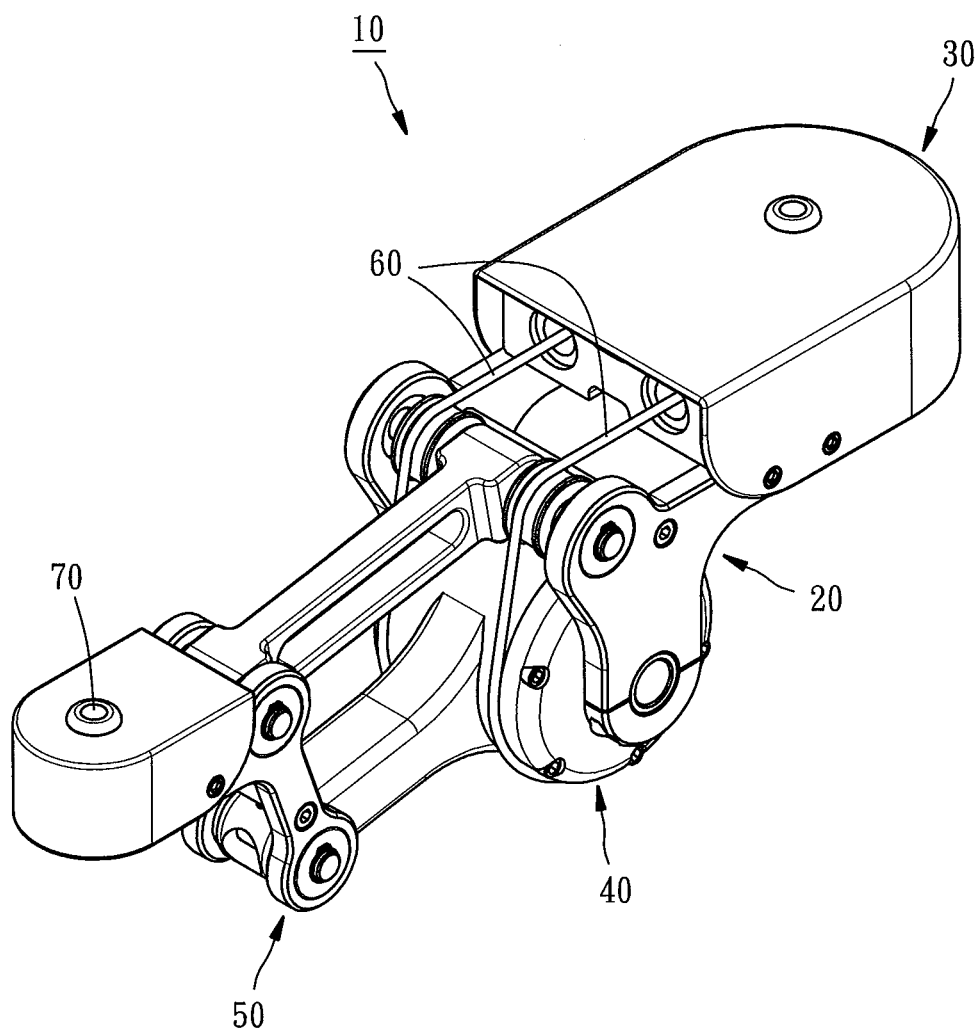
FIG. 1 is a perspective view of a Support arm with brake mechanism according to the present invention.
Figure 2:
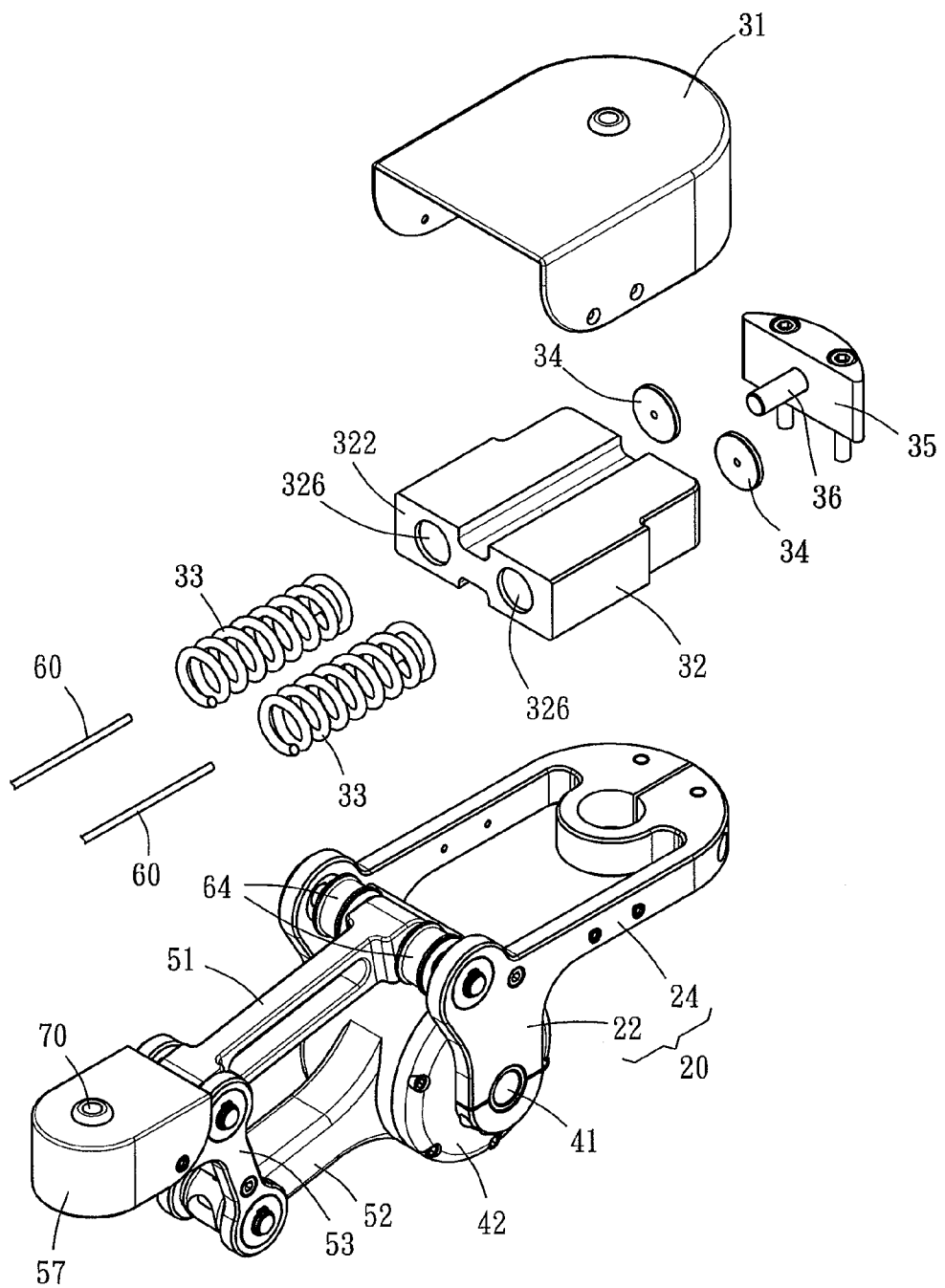
FIG. 2 is an exploded view of the Support arm with brake mechanism according to the present invention.

Referring to FIGS. 1, 2, a Support arm with brake mechanism 10 of the present invention comprises a fixing frame 20, a resilient device 30, a brake 40, a supporting rod 50, and two flexible components 60.

The fixing frame 20 has two opposite pivotal connection portions 22 and carrying portions 24. The carrying portions 24 extend transversely from the two pivotal connection portions 22, respectively.

Figure 4:
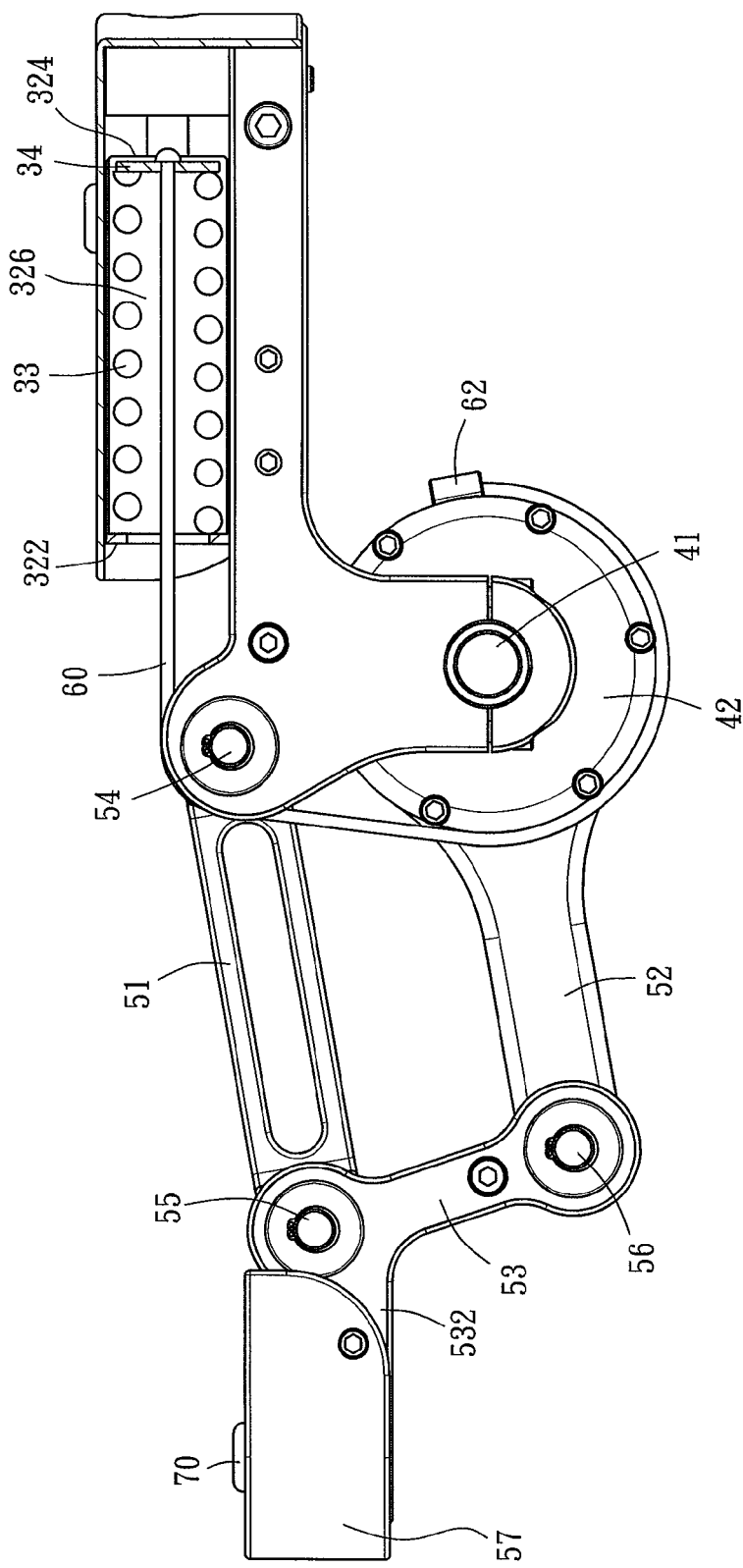
FIG. 4 is a lateral view of the Support arm with brake mechanism according to the present invention.
Figure 7:
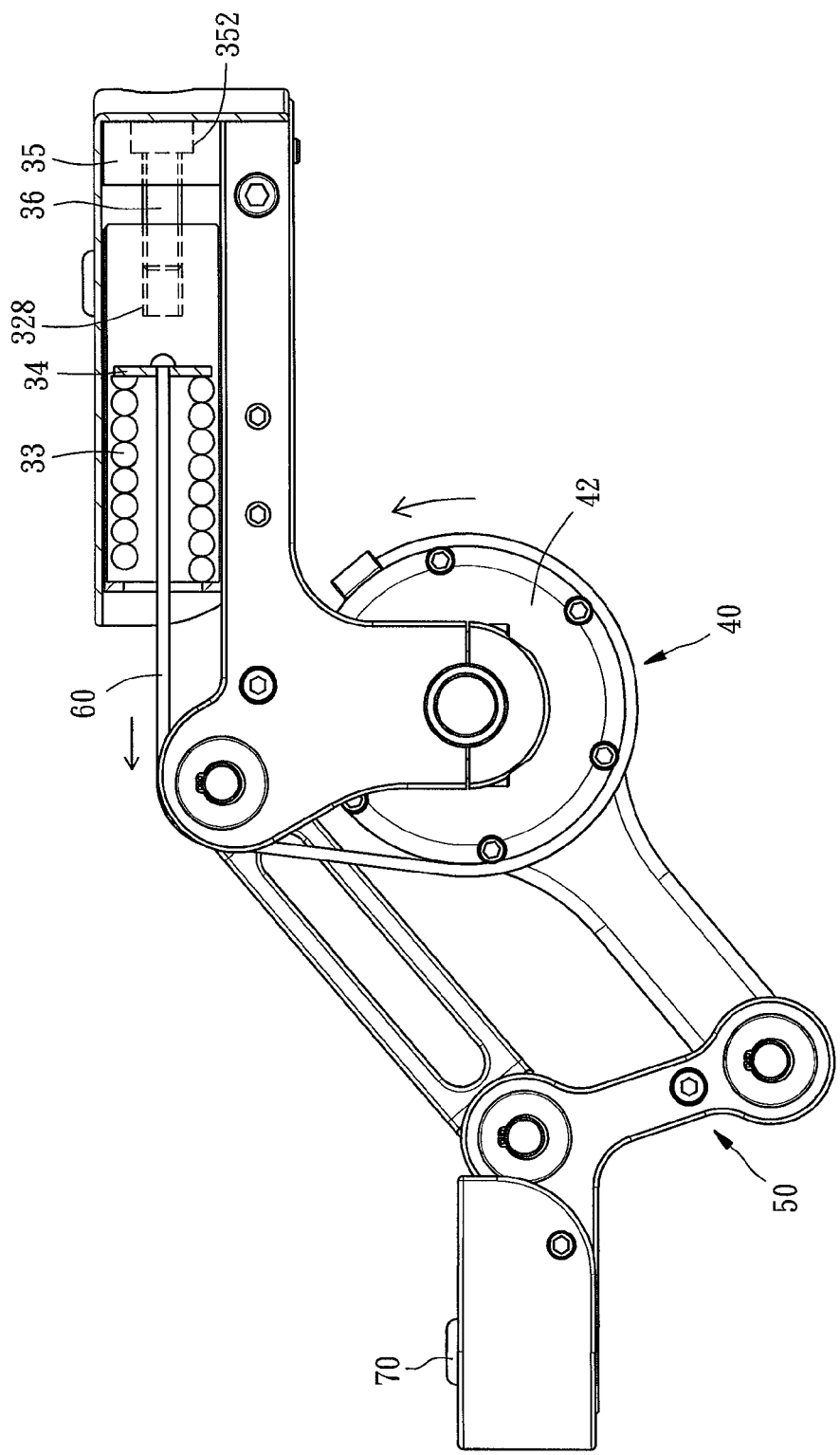
FIG. 7, which is similar to FIG. 4, shows a supporting rod positioned in place.

Referring to FIGS. 2, 4, 7, the resilient device 30 has an external cover 31, a mounting base 32, two resilient components 33, and two end covers 34. The external cover 31 is fixed to the top surfaces of the carrying portions 24 of the fixing frame 20. The mounting base 32 is disposed on the top surfaces of the carrying portions 24 of the fixing frame 20 and hidden inside the external cover 31. The mounting base 32 has a first side surface 322, a second side surface 324 opposing the first side surface 322, and two mounting slots 326 penetrating the first and second side surfaces 322, 324, respectively. The second side surface 324 of the mounting base 32 further has a screw hole 328 disposed between the two mounting slots 326. The resilient components 33 are disposed in the mounting slots 326 of the mounting base 32, respectively, and each have an end abutting against the first side surface 322 of the mounting base 32. The end covers 34 are disposed in the mounting slots 326 of the mounting base 32, respectively, and abut against the other ends of the resilient components 33, respectively. The resilient device 30 further has a preload adjusting block 35 and a preload adjusting screw 36. The preload adjusting block 35 is fixed to the top surfaces of the carrying portions 24 of the fixing frame 20 and has a countersunk hole 352. The preload adjusting screw 36, capable of idle rotation, is disposed in the countersunk hole 352 to mesh with the screw hole 328 of the mounting base 32. Hence, the rotation of the preload adjusting screw 36 causes the mounting base 32 to undergo forward and rearward displacement relative to the fixing frame 20 and thereby adjust the magnitude of the preload of the resilient components 33.

In practice, only at least one said end cover 34, at least one said resilient component 33, and at least one said mounting slot 326 of the mounting base 32 are required, though they are preferably provided in the number of two.

Figure 3:
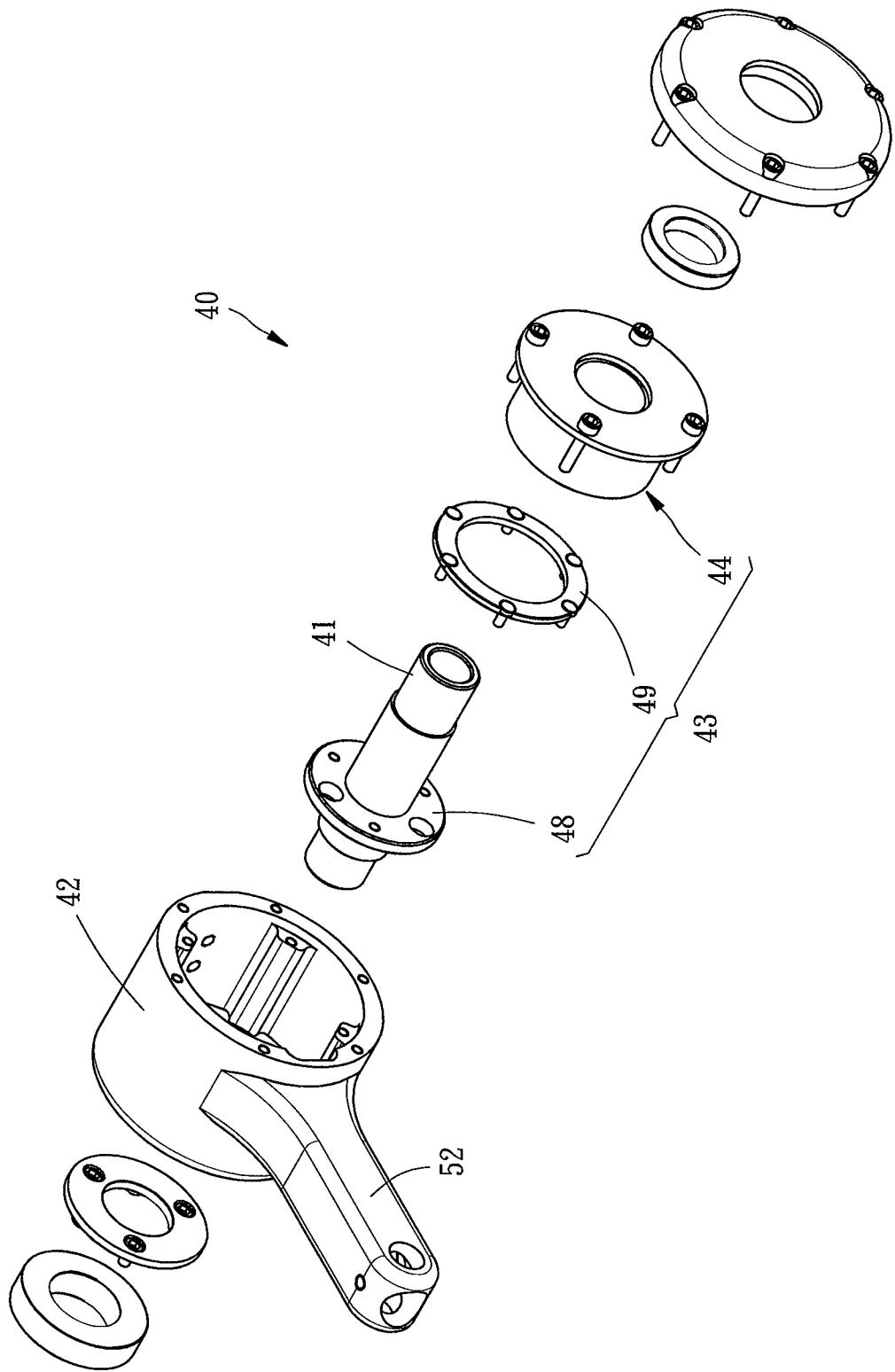
FIG. 3 is an exploded view of a brake according to the present invention.
Figure 5:
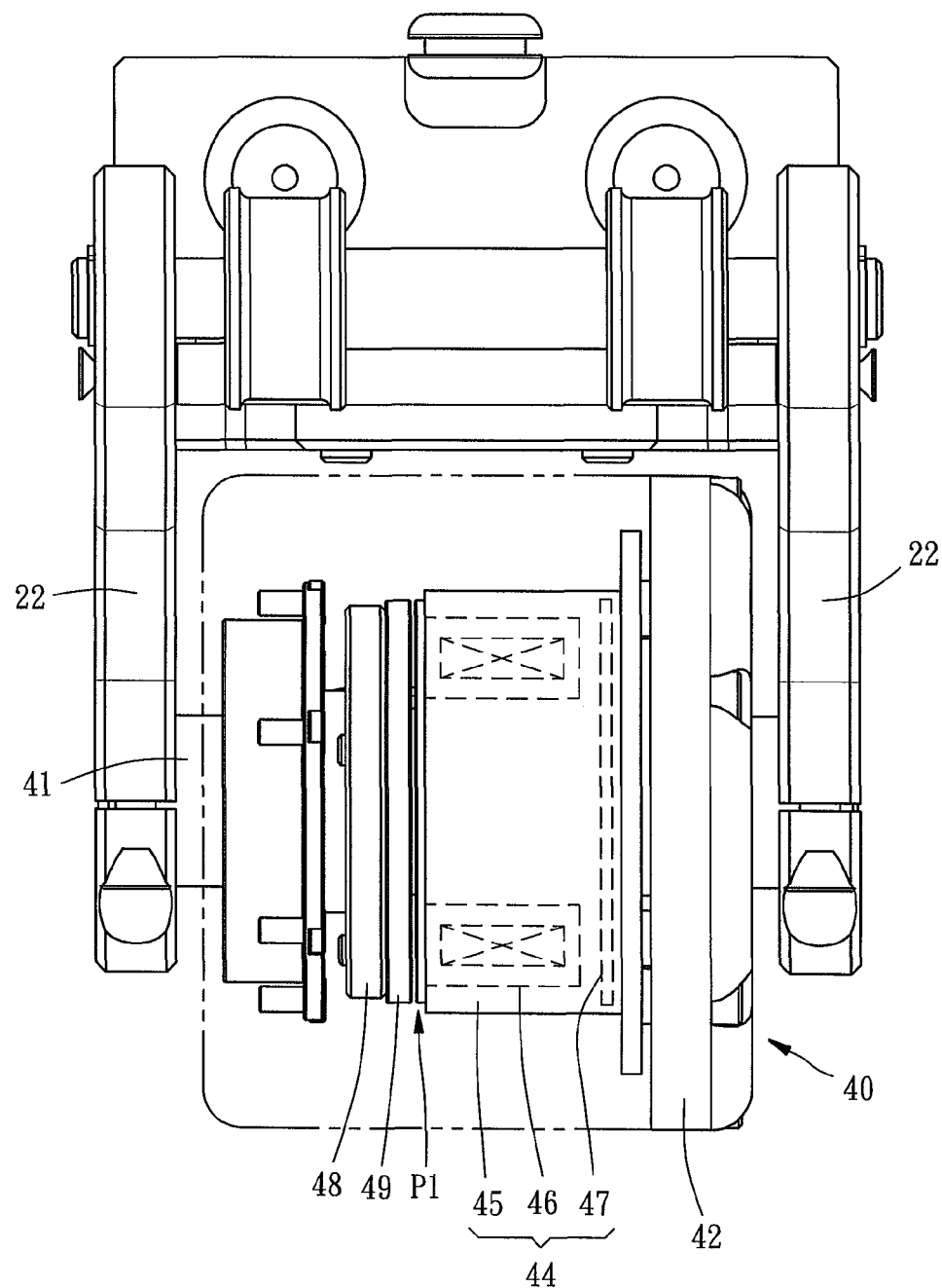
FIG. 5 is a partial cross-sectional view of the Support arm with brake mechanism according to the present invention, illustrative of a brake at a releasing position.

Referring to FIGS. 2, 3, 5, the brake 40 has a main spindle 41, a casing 42, and a braking unit 43. Two ends of the main spindle 41 are fixed to the bottom ends of the pivotal connection portions 22 of the fixing frame 20, respectively. The casing 42 is snugly engaged with the main spindle 41 and thus is capable of rotating about the main spindle 41 and relative to the fixing frame 20. The braking unit 43 has an armature 44. The armature 44 has a yoke 45, a coil 46, and a permanent magnet 47. The yoke 45 is fixed to the casing 42 and snugly engaged with the main spindle 41. The coil 46 and the permanent magnet 47 are disposed in the yoke 45. The braking unit 43 further has a spring leaf 48 and an armature plate 49. The spring leaf 48 is snugly engaged with and thus fixed to the main spindle 41. The armature plate 49 is snugly engaged with the main spindle 41 and thus fixed to a surface of the spring leaf 48, wherein the surface of the spring leaf 48 faces the armature 44.

Referring to FIG. 2 and FIG. 4, the supporting rod 50 has a first rod element 51, a second rod element 52 parallel to the first rod element 51, and a third rod element 53 disposed between the first and second rod elements 51, 52. The rear end of the first rod element 51 is pivotally connected to the top ends of the pivotal connection portions 22 of the fixing frame 20 through a first axle 54. The front end of the first rod element 51 is pivotally connected to the top end of the third rod element 53 through a second axle 55. The rear end of the second rod element 52 is connected to the peripheral surface of the casing 42 of the brake 40. Hence, the casing 42 of the brake 40 rotates in synchrony with the second rod element 52, whereas the front end of the second rod element 52 is pivotally connected to the bottom end of the third rod element 53 through a third axle 56. The top end of the third rod element 53 extends outward and laterally to form an object fixing portion 532. The object fixing portion 532 is coverably provided with a switch unit 57. A control switch 70 is disposed on the top surface of the switch unit 57. The control switch 70 is electrically connected to the coil 46 of the armature 44 and adapted to control the electrical disconnection and electrical connection of the coil 46.

Referring to FIG. 2 and FIG. 4, in this embodiment, the flexible components 60 are each exemplified by a steel cable. The installation process of the flexible components 60 entails winding the two flexible components 60 around the peripheral surface of the casing 42 of the brake 40 in a manner that ends of the two flexible components 60 are fixed to a fixing block 62. The fixing block 62 is fixed to the peripheral surface of the casing 42 of the brake 40. The other ends of the two flexible components 60 wind around an idle wheel 64 snugly engaged with the first axle 54, then pass through the mounting slots 326 of the mounting base 32, and are eventually fixed to the end covers 34, respectively.

Figure 6:
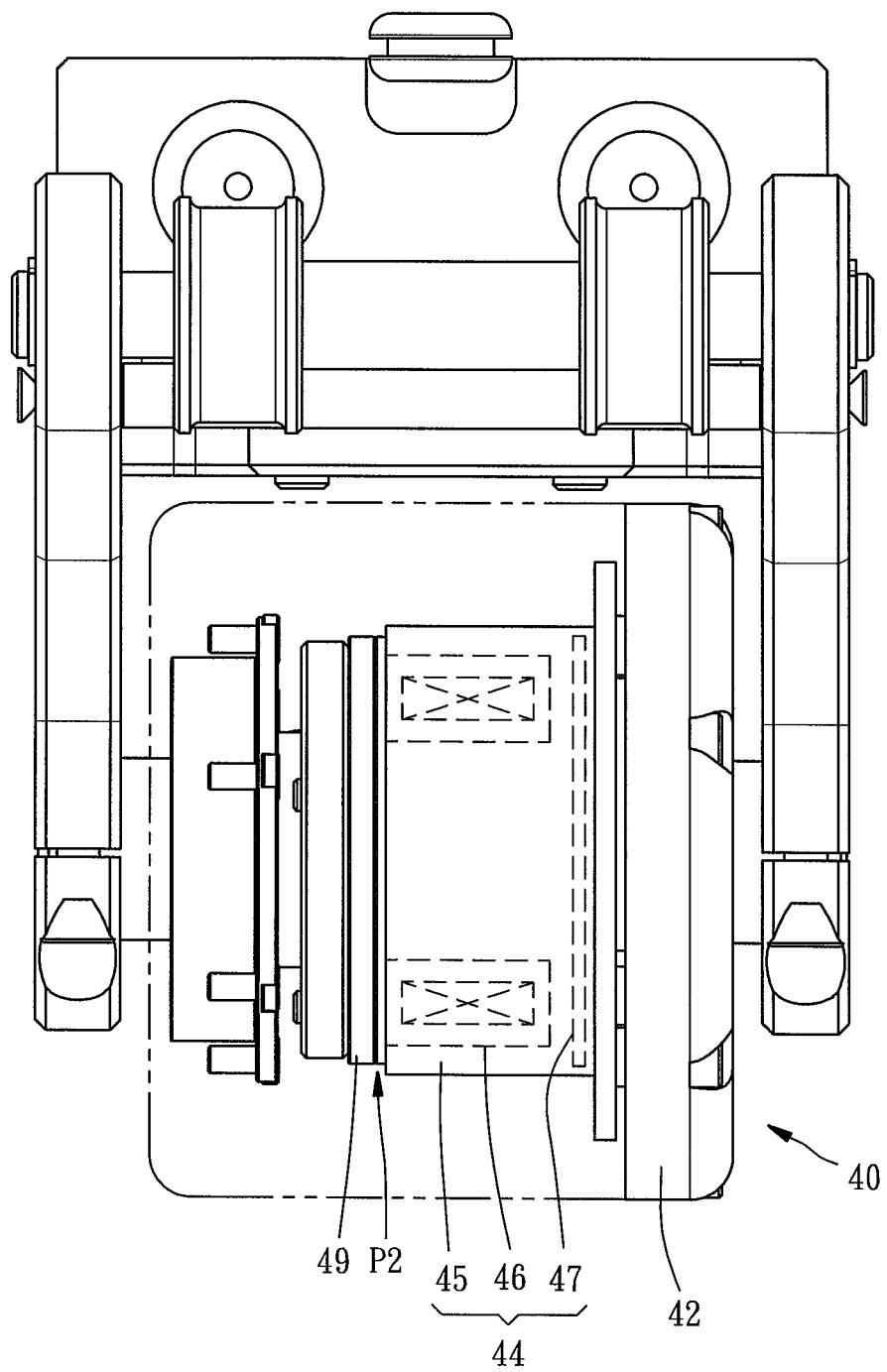
FIG. 6, which is similar to FIG. 5, shows the brake at a braking position.

To begin moving an object, the user presses the control switch 70 to allow the coil 46 of the armature 44 to enter a state of electrical connection, such that not only does a reverse magnetic force generated from the coil 46 counteract the magnetic force of the permanent magnet 47, but the attraction between the yoke 45 and the armature plate 49 also vanishes, thus switching the brake 40 to a releasing position P1 as shown in FIG. 5, then the supporting rod 50 undergoes pivotal rotation to begin moving the object. In the course of moving the object, rotation of the casing 42 of the brake 40 causes the flexible components 60 to pull the end covers 34 connected thereto, and then the end covers 34 begin to compress the resilient components 33, such that the resilient components 33 give stable support to the operation of the supporting rod 50. After the supporting rod 50 has moved the object to an appropriate height, the user presses the control switch 70 again to cause electrical disconnection to the coil 46 of the armature 44. At this point in time, the armature plate 49 is attracted to the yoke 45 under the magnetic force of the permanent magnet 47, thereby switching the brake 40 to a braking position P2 as shown in FIG. 6 and FIG. 7, such that the casing 42 of the brake 40 can no longer rotate, and the supporting rod 50 can brake by means of the brake 40 to thereby finalize the positioning of the object.

In conclusion, according to the present invention, the Support arm with brake mechanism 10 is advantageously characterized in that: the resilient components 33 generates a resilient force acting in opposition to gravity, such that the supporting rod 50 can steadily move the object; in the course of moving the object, a user presses the control switch 70 as needed to start the brake 40, such that the brake 40 can brake the supporting rod 50 and thus fasten the object to a predetermined position, thereby enhancing ease of use.

What is claimed is:
1. A Support arm with brake mechanism, comprising:
a fixing frame;
a resilient device having a mounting base, a resilient component, and an end cover, the mounting base being disposed at the fixing frame and having a first side surface, a second side surface opposing the first side surface, and a mounting slot penetrating the first and second side surfaces, the resilient component being disposed in the mounting slot of the mounting base and having an end abutting against the first side surface of the mounting base, and the end cover being movably disposed in the mounting slot of the mounting base and abutting against another end of the resilient component;

a brake having a main spindle, a casing, and a braking unit, the main spindle being fixed to the fixing frame, the casing being rotatably snugly engaged with the main spindle, and the braking unit being disposed in the casing;

a supporting rod pivotally connected to the fixing frame and a peripheral surface of the casing of the brake; and a flexible component winding around the peripheral surface of the casing of the brake, having an end fixed to the peripheral surface of the casing of the brake, and having another end passing through the mounting slot of the mounting base of the resilient device and fixed to the end cover of the resilient device.

2. The Support arm with brake mechanism of claim 1, wherein the braking unit has an armature, a spring leaf, and an armature plate, the armature being snugly engaged with the main spindle and fixed to the casing, the spring leaf being fixed to the main spindle, and the armature plate being snugly engaged with the main spindle and fixed to a surface of the spring leaf, wherein the surface of the spring leaf faces the armature, wherein, if the armature is in a state of electrical disconnection, the armature plate is attracted to the armature, thereby switching the brake to a braking position, wherein, if the armature is in a state of electrical connection, the armature lets the armature plate go, thereby switching the brake to a releasing position.

3. The Support arm with brake mechanism of claim 2, wherein the armature has a yoke, a coil, and a permanent magnet, the yoke being fixed to the casing and snugly engaged with the main spindle, wherein the coil and the permanent magnet are disposed in the yoke, the brake further having a control switch electrically connected to the coil of the armature and adapted to control electrical disconnection and electrical connection of the coil, wherein the armature plate is attracted to the yoke through a magnetic force of the permanent magnet if the coil is in a state of electrical disconnection, wherein the yoke lets the armature plate go if the coil is in a state of electrical connection.

4. The Support arm with brake mechanism of claim 3, wherein the supporting rod has a first rod element, a second rod element parallel to the first rod element, and a third rod element disposed between the first and second rod elements, the first rod element having an end pivotally connected to the fixing frame through a first axle and another end pivotally connected to an end of the third rod element through a second axle, the second rod element having an end connected to the peripheral surface of the casing of the brake and another end pivotally connected to another end of the third rod element through a third axle, and the third rod element having a switch unit provided thereon with the control switch.

5. The Support arm with brake mechanism of claim 4, wherein the flexible component winds around an idle wheel rotatably snugly engaged with the first axle.

6. The Support arm with brake mechanism of claim 1, wherein the second side surface of the mounting base has a screw hole, and the resilient device further has a preload adjusting block and a preload adjusting screw, the preload adjusting block being fixed to the fixing frame and having a countersunk hole, and the preload adjusting screw being capable of idle rotation and disposed in the countersunk hole to mesh with the screw hole of the mounting base.

7. The Support arm with brake mechanism of claim 1, wherein an end of the flexible component is fixed to a fixing block, and the fixing block is fixed to the peripheral surface of the casing of the brake.

\* \* \* \* \*